Oct. 25, 1960    W. KAUFMANN ET AL    2,957,716
BUTT JOINT ON CARBON ELECTRODES FOR ELECTRIC FURNACES
Filed April 2, 1958    3 Sheets-Sheet 3

2,957,716
BUTT JOINT ON CARBON ELECTRODES FOR ELECTRIC FURNACES

Waldemar Kaufmann, Alfred Ragoss, and Erich Fitzer, Meitingen, near Augsburg, and Ludwig Gress, Augsburg, Germany, assignors to Siemens-Planiawerke Aktiengesellschaft für Kohlefabrikate, Meitingen, Germany, a corporation of Germany Filed Apr. 2, 1958, Ser. No. 725,953

Claims priority, application Germany Apr. 11, 1957

15 Claims. (Cl. 287—127)

Our invention relates to a butt joint between graphite or other carbon electrodes for electric furnaces, and particularly to electrode joints that comprise a double-conical threaded nipple plug of electrode material whose two conically tapering portions are in threaded engagement with respective frusto-conical cup-shaped socket recesses in the butt faces of the coaxially aligned electrodes, such butt joints serving to join a new electrode with the end of a nearly consumed electrode to permit a continuous furnace operation by replenishing the electrode material in accordance with the rate of consumption.

Such electrode joints are mechanically weaker than the full-bodied portions of the electrodes. The joints are therefore particularly susceptible to breaking and are subjected to additional stresses by thermal tensions occurring during cooling and shrinking of the electrodes. The high current loading of modern electro-furnaces causes additional stresses by overheating in the nipple portion at the junction places between the nipple and the electrode sockets. All such thermal stresses are particularly critical with electrodes of large diameters, such as those above 400 mm., and in electric furnaces operating at very high voltages as used for reducing the melting-in period and increasing the furnace capacity.

It is an object of our invention to provide a double-conical nipple junction which is reliably capable of withstanding the above-mentioned aggravated operating conditions in modern electro-steel furnaces and thus greatly minimizes or eliminates the occurrence of breakage within the socket recesses of the electrodes.

Butt joints in cylindrical electrode assemblies of graphite or other carbon materials comprising double-conical screw nipples are known in general. For making such a junction, one of the conical portions of the nipple plug is first screwed into the female threads in the socket of the lower, already operating electrode up to a stop which prevents further rotation of the nipple. Then the second, new electrode is placed upon the nipple with its socket engaging the other conical portion of the nipple, and is screwed tight onto the nipple. The second electrode, however, can be turned onto the nipple only until the front of the electrode abuts against the other electrode, although the screw thread of the nipple as such would permit further rotation. Therefore, in order to obtain a strong contact pressure of the electrode front faces against each other, the nipple thread must be so cut that the front faces of the electrodes are already pressed against each other before the limit position of the thread is reached. As a result, both flanks of the nipple thread rest against both flanks of the counter thread in the socket of the first electrode, whereas the flanks of the nipple thread in the second electrode press only against those thread flanks of the socket that face toward the butt faces of the electrodes contacting each other. When tightening the threaded joint up to contacting engagement between the two electrode front faces, however, the nipple would have to be slightly lifted from the counter flank of the socket thread in the first engaged electrode so that some clearance will remain. A good nipple connection is predicated upon having the engagement areas of the thread flanks in both socket spaces sufficiently large to prevent overheating when electric furnace current passes through the joint.

Observations in practice, extending over a number of years, have shown that in almost all cases the socket portions of the electrodes crack and tear during operation of steel furnaces, particularly with high-duty electrodes of large diameter. This causes considerable trouble and danger for the following reasons.

(1) Due to breaking of the electrode socket, the relatively weak junction in the electrode assembly is additionally loosened. This increases the danger of electrode parts breaking away and falling into the steel bath thus causing trouble or stoppage in furnace operation;

(2) The breaking of the sockets further interrupts the electric contact resistance at the breakage localities. This causes current losses as well as overheating at the breakage localities which may also result in premature destruction of the electrode assembly.

Systematic measurements of the difference in temperature between nipple and electrode socket have shown that the temperature differences actually occurring in modern furnaces are much greater than can be compensated by the clearance heretofore obtainable between the outer and inner thread peripheries of the nipple and the electrode with which the nipple is first screwed together, such clearance resulting merely from the subsequent tightening of the second electrode upon the nipple.

Due to the difference in expansion between nipple and electrode socket occurring particularly during cooling, a strong bursting action is exerted upon the electrode socket when both thread flanks of the nipple are firmly engaged with the mating thread of the socket.

It has been recognized that the breakage of the electrode joint at the one electrode socket into which the nipple is first screwed, such breakage occurring in most cases during cooling of the electrode, is caused by the fact that the electrode socket shrinks to a greater extent than the nipple so that breakage takes place if the nipple thread is in rigid contact with the counter thread of the socket. It is therefore a more specific object of our invention to devise a nipple joint for graphite- and other carbon-electrodes which is particularly suitable with electrodes that are subjected to alternating thermal stresses of the type above mentioned, and which is particularly advantageous with electrodes of large diameter.

According to our invention, the thread flanks that on each of the two nipple cones face away from the butt faces are spaced from the adjacent socket-thread flanks a distance approximately equal to the corresponding spacing between the respective thread flanks of the other cone and socket.

Such equal flank spacing in both sockets is maintained, according to another feature of the invention, by means of spacer bodies of thermally instable material which are inserted into the threaded engagement between nipple and socket, or are placed onto the bottom of the socket space. However, according to another feature of our invention, the above-defined approximately equal flank spacing in both sockets can also be maintained by first turning the nipple tight until it is in fast and rigid engagement with the first electrode, thereafter screwing the nipple in the reverse direction a sufficient extent, and then fixing it in position before joining a second electrode with the nipple. Regardless of the particular means used for obtaining and preserving the equal flank spacing in both sockets, a joint thus made has the effect that during operation of the electrode assembly the outer nipple can expand within the colder socket.

More in detail, the approximately equal spacing of the thread flanks in the nipple facing away from the butt faces of the electrodes on the one hand and the counter thread in the socket on the other hand, can be obtained in various ways as exemplified by the modifications described presently.

According to a more specific feature, the means for maintaining the spacing between the thread flanks consists of an insert which covers one or two turns of the thread in the socket. This insert is made of a material which is instable at the electrode operating temperature, i.e. becomes carbonized or deformed at the elevated temperatures occurring during operation of the electrode assembly. For example, paper may be used as insert and may be placed into the turns of the socket or nipple portion first to be screwed together.

However, we have also found it advantageous to place similar spacer bodies, such as the above-mentioned paper strips, into the second electrode socket or into the threads of the second nipple portion. The suitable thickness of the strips depends upon the desired spacing of the thread flanks. Such additional inserts prevent mistakes when making the joint. Furthermore, the insertion of the second spacers affords an additional checking of the proper nipple dimension in comparison with the mating sockets to be engaged thereby. That is, the second electrode, despite the presence of the spacing means, must permit itself to be screwed onto the second threaded portion of the nipple with the aid of a predetermined screwing torque to such an extent that the front faces of the electrodes enter into the desired good contact with each other. If such front-face contact cannot be obtained with the aid of the predetermined screwing torque, then this indicates that the nipple being used is too large for the socket to satisfy the required tolerance. Such additional possibility of checking thus permits discarding an improper nipple before placing the electrode assembly into operation. Heretofore, a nipple outside the desired tolerance limits was not recognizable because even if the unilateral, asymmetrical screwing together resulted in a good front-face contact, the nipple could be such as to burst the socket, both thread flanks of the nipple firmly engaging and stressing that socket. The term "asymmetrical," with reference to joining the nipple with the electrodes by screwing, is meant to denote the fact that the spacing between the thread flanks, i.e. the thread clearance in the electrode first joined with the nipple, is different from the corresponding spacing in the socket of the second electrode subsequently screwed onto the other half of the nipple. In contrast thereto, the joint according to the invention is symmetrical; that is, the spacing at the nipple-thread flanks facing away from the butt faces of the electrodes is approximately equal in both sockets.

It is preferable to make the thickness of the insert to be placed into the turns of the thread slightly less than the ultimately desired spacing between the thread flanks.

When using the above-mentioned insert strips of material which carbonizes or becomes plastically deformed at elevated temperature, an additional effect can be obtained by providing these inserts, having the form of foils or strips, with hand granules which during the tightening of the screw threads freeze into the relatively soft turns of graphite electrode and graphite nipple. Such strips are generally comparable with sand paper or emery paper having both sides provided with granular material. As a result, the inserted strips prevent the cold electrodes from becoming loose at the joint under the vibrating action occurring in the electric furnace.

The above-mentioned inserts may also consist of foils of synthetic plastic or of low-melting metals such as lead, tin, zinc, aluminum and others. However, we found it to be preferable and most economical to use strips of paper or cardboard because such strips are readily available with the required thicknesses.

The insertion of spacer bodies into the screw threads has the further advantage that the electrode sockets and nipple members, made in mass production, can be used without additionally checking their dimensions, such as the depth of the sockets, and without the necessity of additionally producing auxiliary shaped bodies or providing any grooves or recesses in the electrode sockets in addition to the screw threads.

The above-mentioned and more specific objects, advantages and features of our invention will be apparent from, and will be described in, the following in conjunction with the drawings in which.

Figure 1:
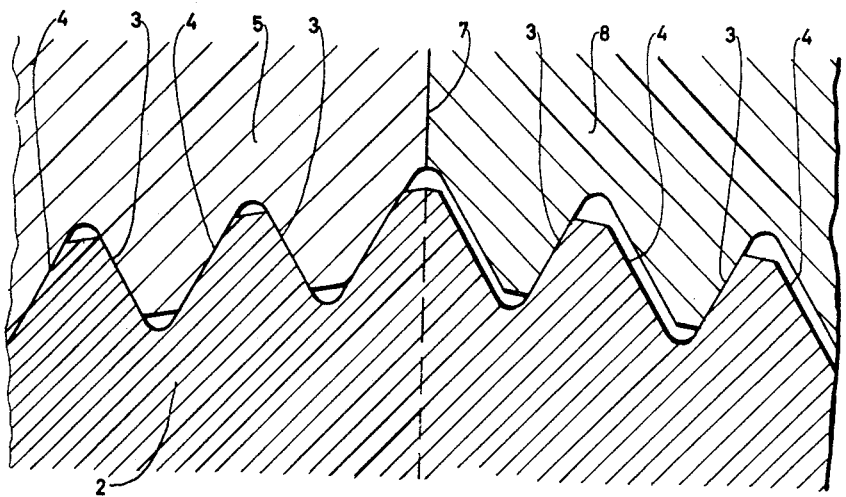
Fig. 1 is explanatory and represents schematically a double-conical nipple junction between two carbon electrodes of the conventional, asymmetrical type.
Figure 7:
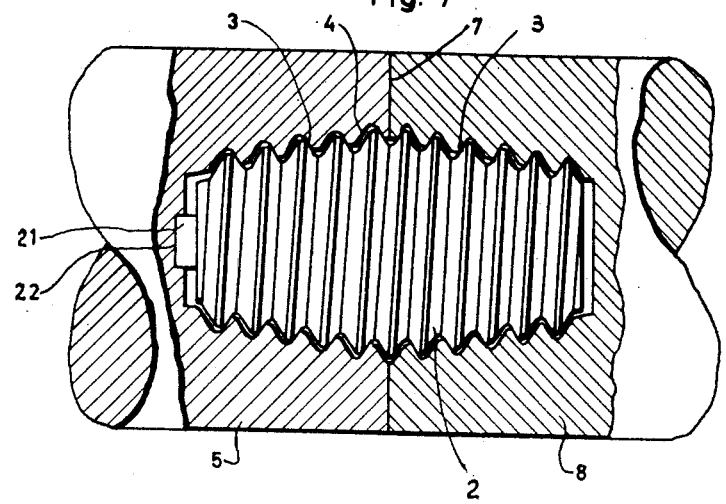
Fig. 7 shows, partly in longitudinal section, a complete electrode joint according to the invention including a spacer member between the nipple and the socket bottom of one of the electrodes.

In all illustrations the same reference numerals are used for respective corresponding elements which will first be briefly described with particular reference to Figs. 1 and 7.

As shown, two carbon electrodes 5 and 8 are coaxially joined with their respective front faces abutting against each other at 7. The junction is made and tightened by means of a double-cone screw nipple 2 whose two male thread portions, tapering from the axial center toward the two ends, are generally frusto-conical and in threaded engagement with female threads in the similarly frusto-conical socket recesses of the electrodes. When making the joint, the nipple plug 2 is first joined with the electrode 5. Thereafter, the second electrode 8 is screwed onto the nipple 2. All joints are shown in completed and tightened condition. The nipple thread flanks facing toward the butt faces 7 are denoted by 3; and the nipple thread flanks facing away from the butt faces are denoted by 4.

The known nipple junction shown in Fig. 1 and discussed below in comparison with joints according to the invention, exhibits full contact engagement of both thread flanks 3 and 4 between the nipple 2 and the socket of the first-joined electrode 5, whereas only the butt-facing flanks 3 of the nipple thread are in contact with the socket thread of electrode 8.

Figure 8:
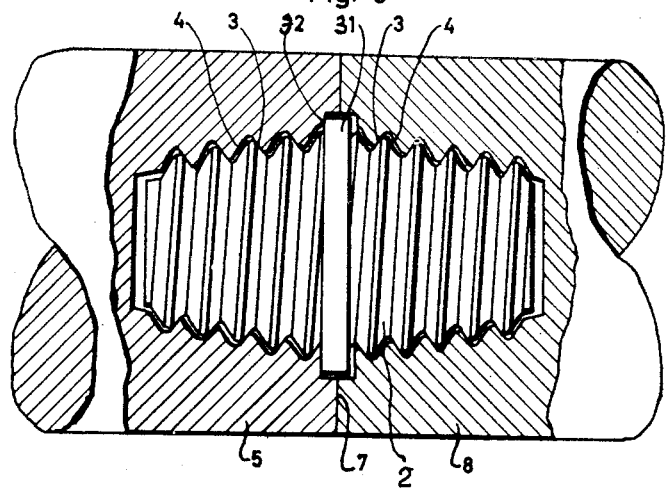
Fig. 8 shows, also partly in longitudinal section, a complete electrode joint according to the invention in which the nipple is provided with an annular shoulder in its radial center plane.

In contrast to such asymmetrical threading conditions, all embodiments of the invention show an approximately equal spacing between the nipple-thread flanks 4 and the socket thread in both cone portions of the nipple, and the full-contact engagement of the thread flanks 3 also in both cone portions. According to Fig. 2 the equal spacing at flanks 4 is secured and maintained by spacer strips 1 inserted between the nipple and socket threads. In Fig. 7 a spacer body 21 is located in one electrode socket. In Fig. 8 an annular shoulder 31 of the nipple 2 serves similar purposes.

In the further description reference is made to the terms defined as follows:

$\beta$ denotes the inclination angle of the thread flanks relative to the electrode front face.

$\alpha_L$ is the thermal coefficient of expansion in the longitudinal (axial) direction.

$\alpha_Q$ is the thermal coefficient of expansion in the transverse direction.

$P_F$ is the area pressure of the thread flanks upon each other.

$P_L$ and $P_Q$ are the longitudinal and transverse components respectively resulting from the total area pressure $P_F$.

By virtue of the above-described insertion of paper strips or other spacer members according to the invention for securing symmetrical screwing conditions of the double-conical nipple, the thread tolerance between nipple and electrode sockets can be made larger than theretofore, in order to better satisfy the requirements resulting from the temperature differences and the different coefficients of expansion of nipple and electrode socket respectively. This possibility of desirably increasing the thread tolerance will be understood from the following. Assume that the screw nipple, in accordance with the increased tolerance afforded by the invention, is made smaller than heretofore permissible. Then the screwing together of the smaller nipple with the first electrode can be effected in the same manner as would have to be done with the larger nipple (having a smaller tolerance), namely until the nipple thread abuts against the counter thread. However, since in this case the spacer strips or other spacer means limit the relative rotation, the desired spacing at the thread flanks 4 is maintained; and the enlarging of the tolerance limits (i.e. the reduction in nipple size) makes itself felt only in the other electrode socket where, in accordance with the foregoing explanation, this does not have a detrimental effect. In contrast thereto, if the spacer members are not used, the reduction in nipple size would result in an excessive increase in electric contact resistance in the just-mentioned second electrode socket and also in objectionable reduction of the pressure-transmitting thread areas.

Figure 2:
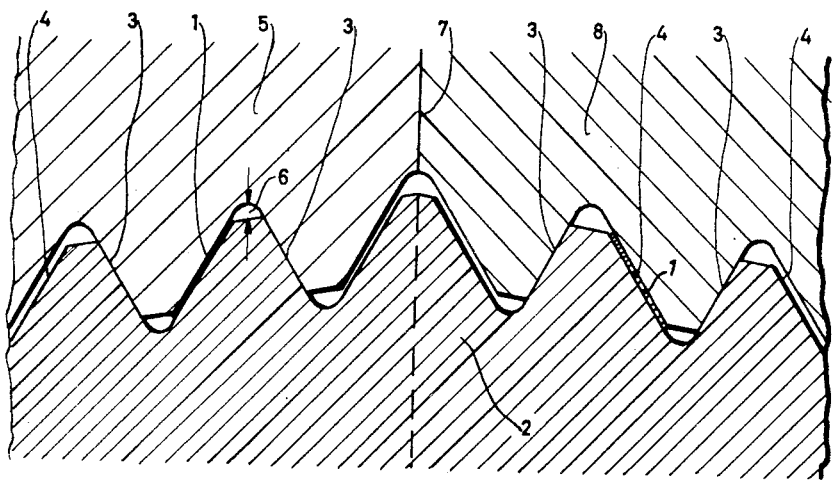
Fig. 2 illustrates schematically a nipple junction according to a preferred embodiment of the invention in which the nipple-thread flanks that face away from the butt faces are spaced from the counter flanks of the electrode socket approximately equal distances on the two conical sides of the nipple.

In order to make certain that the pressure-transmitting thread areas between nipple and electrode sockets are kept sufficiently large, and in accordance with another feature of our invention, the screw thread of the nipple is so shaped as to provide, in the symmetrically tightened joint, a radial spacing between the crest of the nipple thread from the bottom groove of the socket thread in an amount of at least 0.05% of the outer nipple diameter, at normal room temperature (20° C.). Such radial spacing is indicated in Fig. 2 at 6.

Figure 3:
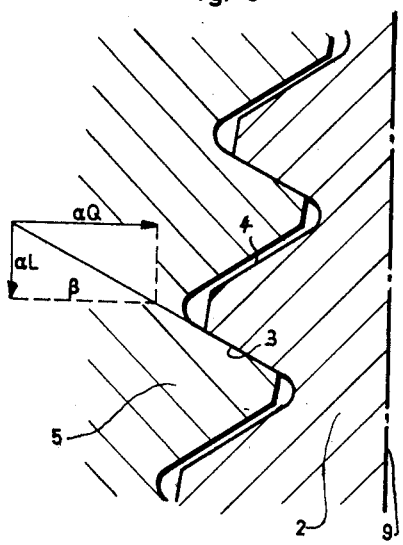
Figs. 3 and 4 are schematical and serve for explaining the forces occurring in the screw junction in dependence upon the angle of inclination of the thread flanks relative to the electrode axis, and the respectively different coefficients of thermal expansion in the longitudinal and transverse directions of the thread.

As mentioned, the tightening of the nipple joint must provide for sufficient contact pressure between the front faces of the electrodes. It has been found that such pressure is readily obtainable in most cases at normal room temperatures, which are those at which the joint is made. However, during operation of the electrode assembly in the furnace the contact pressure is often lost. The cause for such loosening has been found to reside in the fact that, at the above-mentioned temperature differences between nipple and socket, the greater expansion of the nipple not only imposes radial pressure upon the socket but also results in greater longitudinal expansion of the nipple as compared with the socket. This explains the loosening of the front faces during furnace operation. However, the contact pressure between the electrode front faces adjusted at room temperature, for instance by the given screwing-in torque, remains preserved during subsequent occurrence of temperature differences between nipple and socket if the coefficients of thermal expansion ($\alpha_L$, $\alpha_Q$) of the nipple in the longitudinal (axial) direction, on the one hand, and in the transverse (radial) direction, on the other hand, have a given ratio to each other. It is apparent from the diagram in Fig. 3 that this ratio $\alpha_L/\alpha_Q$ is equal to the tangent of the inclination angle $\beta$ of the nipple thread relative to the butt faces.

In the double-cone nipple joints conventionally used today, the inclination angle of the nipple thread is 30°. According to another feature of the invention, therefore, the nipple for the conventional inclination angle is so made, and the nipple material is so chosen, that the ratio of thermal expansion $\alpha_L/\alpha_Q$ is equal or smaller than about 1:2. At the limit condition $\alpha_L/\alpha_Q = 0.57$, the contact pressure between nipple and socket remains the same for all temperature differences because the more strongly expanding nipple can slide on the inclined plane formed by the flanks of its screw thread. This is strictly correct only if the friction of the thread flanks is neglected. If $\alpha_L/\alpha_Q$ is smaller than 0.57, there occurs an additional pressure upon the thread flanks in the radial direction which, with the exception of the pressure component required for overcoming friction, is transformed by the rigid, hardly deformed socket into an additional contact pressure between the electrode front faces.

The desired ratio of $\alpha_L/\alpha_Q$ is obtained by suitable choice of the coke raw material used for the graphite of the nipple, which raw material provides for the desired degree of orientation when being shaped into the nipple by extrusion. According to experience, the use of the conventional coke raw materials for graphite electrodes and nipples does not permit varying the ratio of thermal expansion in longitudinal and transverse directions respectively beyond the limits of 1:3 to 1:4. For that reason, it is another feature of our invention in pursuance of the above-disclosed concept, to adapt the inclination angle of the nipple thread to the realizable ratio of longitudinal to transverse expansion of the nipple materials. For example, when the ratio of longitudinal to transverse expansion is approximately 1:1, an inclination angle of $\beta = 45°$ is preferably chosen.

For further explaining the conditions obtaining during expansion of nipple and electrode sockets, a comparison is made below between empirical data of the conventional double-cone nipple joints and nipple joints made according to the invention.

In both cases the electrodes used had the following data:

Diameter 600 mm.
Thermal coefficient of expansion $\alpha_L = 2.2 \cdot 10^{-6}$ per ° C.
Thermal coefficient of expansion $\alpha_Q = 2.5 \cdot 10^{-6}$ per ° C.

In both cases the screw connection was made with a tightening torque of 415 m./kg.; the nipple used had an outer diameter of about 300 mm., a thread-flank angle of 30°, and a pitch of 3 turns per inch.

(a) Conventional nipple joint

The nipple had a coefficient of thermal expansion of $\alpha_L = 3.0 \cdot 10^{-6}$ per ° C., and $\alpha_Q = 3.5 \cdot 10^{-6}$ per ° C.

The median machining tolerance was minus 0.10 mm., representing the lowermost measure of the nipple. This corresponds to a median width of the contact areas at the screw-thread flanks of 4.15 mm.

(b) Joint according to the invention

The nipples used had a coefficient of thermal expansion $\alpha_L = 1.8 \cdot 10^{-6}$ per ° C., and $\alpha_Q = 3.5 \cdot 10^{-6}$ per ° C. The median value of the lower tolerance limit of the nipples, chosen according to the invention, was minus 0.5 mm. This corresponds to a median width of the thread contact areas of 3.95 mm. The joints according to the invention were provided with paper inserts in the threads of both electrode sockets and had a thickness of 0.2 mm. which, after tightening of the joint, was compressed to approximately 0.1 mm. The thickness ($d$) of the compressed insert can be calculated from geometric considerations as: $d=\frac{1}{2}\cdot$minus tolerance of nipple$\cdot \sin \beta$. In the case of $\beta = 30°$: $d = \frac{1}{4} \cdot$minus tolerance of nipple.

Both types of electrode joints were simultaneously heated in a number of parallel tests to 1,600° C., and were simultaneously pulled out of the steel furnace in hot condition. During subsequent cooling under normal operating conditions, the conventional joints ($a$) exhibited longitudinal breakage or cracks in all electrode sockets first joined with the nipple. The other sockets in all specimens of type ($a$) also exhibited such cracks in approximately 50% of all cases.

No breakage or cracks were observed in the electrode sockets of the screw-nipple joints ($b$) according to the invention subjected to the same test conditions.

Comparative measurements of the electric contact resistances in the nipple joints according to ($a$) and ($b$) showed that the average resistance, within the error limits, was the same in both types. It was further found that approximately 60 to 65% of the electric current flows over the butt faces of the electrodes, with the rest of 40 to 35% flowing through the nipples. This seems to explain why the same average total resistance was measured in both types ($a$) and ($b$) despite the fact that the thread-contact areas were reduced about 5% in type ($b$) compared with type ($a$).

The above-mentioned translation of the radial pressure due to thermal expansion into an axial pressure which increases the contact pressure between the front faces of the electrode, is predicated upon sufficient mechanical strength of the electrode sockets.

Figure 4:
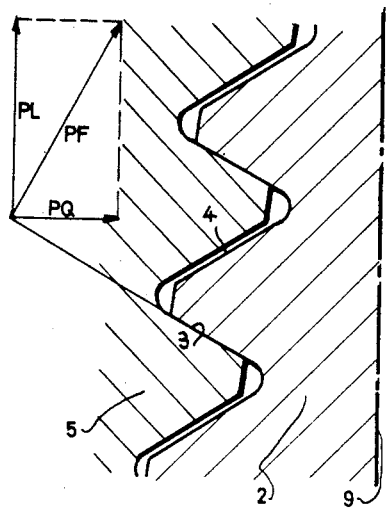
Figure 5:
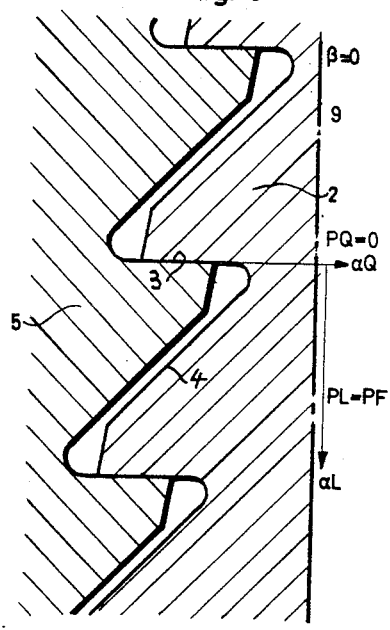
Fig. 5 shows in section a saw-tooth thread whose active pressure flanks have an angle of inclination $\beta=0°$ relative to the electrode front face.
Figure 6:
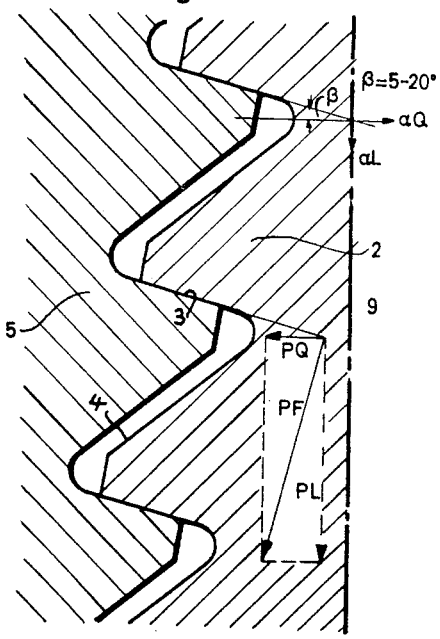
Fig. 6 shows a thread in which the corresponding angle of inclination $\beta=15°$.

The pressure conditions are graphically illustrated in Figs. 4, 5 and 6. Due to the inevitable roughness of the screw threads, particularly with a relatively steep pitch (preferably more than 30°), the greater expansion of the nipple and the resulting area pressure $P_F$ is not always compensated by gliding of the thread flanks upon each other. For that reason, weak spots in the socket may be torn. When using a true saw-tooth thread with an inclination $\beta = 0°$, no pressure would be exerted upon the thread flanks during increased expansion; but, in this case, no increased contact pressure between the electrode front faces is produced by the increased nipple expansion, as is apparent from Fig. 5. Also in this case (Fig. 5), the nipple does not center itself in the socket thread so that additional auxiliary means must be provided for centering. Therefore, according to a further feature of the invention, we prefer giving the pressure-transmitting thread flanks 3 of the nipple joint an inclination angle relative to the butt faces which is larger than 0° and smaller than 30°, preferably an angle of inclination ($\beta$) between 5 and 20°.

With such thread-inclination angles according to the invention there still occurs the desired centering effect as well as a transformation of the radial expansion into front-face contact pressure; but the transmission ratio, corresponding to tan $\beta$, and hence the loading imposed upon the thread flanks, is considerably smaller with the smaller angles (see Fig. 6).

With such smaller angles $\beta$, however, the above-disclosed considerations requiring a given ratio between the longitudinal and transverse expansion of the nipple can no longer be realized in practice. This is so because these angles would require expansion ratios of 1:3 to 1:20 which cannot readily be produced technologically. For that reason, the embodiments of our invention provided with the above-disclosed intermediate angles of 5 to 20° are mainly significant for electrode joints of relatively weak electrode material because in such cases a loosening of the front-face contact can be put up with more readily than a radial pressure upon the socket wall tending to crack the socket.

The danger of breaking the electrode joint can also be minimized by means of a spacer body which acts upon the socket bottom of the electrode first joined with the nipple and which forms a stop limiting the screwing-in movement of the nipple.

Such a spacer insert on the bottom of the electrode socket should have the same or a smaller thermal coefficient of expansion than the electrode. The spacer body may consist of a material which is plastically deformable at temperatures above 200° C. Suitable for this purpose, for instance, is hard pitch which becomes carbonized to coke during electric furnace operation and which forms an electrically conducting connection between the socket bottom and the nipple. Also suitable for the spacer member is a carbide-forming metal which forms an electrically conducting metal carbide with the carbon of electrode and nipple when the electrode joint is heated during furnace operation. The spacer member may consist of the same carbonaceous material as the nipple itself and may also form an integral projection of the nipple body. According to another feature of the invention, the spacer or stop member of the nipple may be formed by an annular shoulder portion located in the axial center plane of the nipple and abutting against a matingly formed shoulder recess at the mouth of the electrode socket.

Embodiments of the modifications just described are illustrated in Figs. 7 and 8.

According to Fig. 7 a spacer body 21 is placed into a recess 22 at the bottom of the electrode socket first joined with the double-cone nipple 2. In the limit position of the screwed-in nipple 2 determined by the spacer body 21, the flanks 3 of the nipple thread are in pressure contact with the counter threads of both electrode sockets, these flanks 3 being those that face toward the butt faces 7. After joining and tightening the nipple 2 with the second electrode 8, the nipple-thread flanks 4, facing away from the butt faces 7, are spaced from the adjacent counter threads of the respective sockets a distance which is approximately equal on both cone portions of the nipple.

In the embodiment of Fig. 8, the nipple 2 is provided with a radially protruding, annular shoulder portion 31 located in the axial center plane of the nipple. Both electrodes 5 and 8 are provided with a radial shoulder enlargement at the mouth of the electrode socket so that the nipple shoulder 31 is tightened against a shoulder 32 of the electrode first joined with the nipple. After the second electrode 8 is joined and tightened together with the nipple, the spacing of the nipple-thread flanks 4, facing away from the butt faces 7, is approximately equal in both electrode sockets. It will be obvious that the shoulder portion 31, instead of being integral with the nipple body, may also be formed of two semicircular portions which are faced into a peripheral groove in the axial center plane of the nipple 2 and which brace themselves in the shoulder recess of the electrode socket.

As mentioned earlier above, the desired spacing of the thread flanks according to the invention may also be secured without the aid of the above-described spacer members, namely in the following manner. First the nipple is turned into the socket of the first electrode until the junction between nipple and electrode is tight. Then the nipple is turned back to a slight extent in order to provide for the proper spacing at the nipple-thread flanks facing away from the electrode front face. In this position the nipple is secured in position relative to the electrode, for example by means of a transverse pin or cotter. After joining the nipple with the second electrode and tightening the second electrode, the joint satisfies the required condition that the nipple-thread flanks facing away from the butt faces have approximately equal spacing from the counter thread in the two electrode sockets, whereas the nipple-thread flanks facing toward the butt faces are in pressure-transmitting contact with the counter threads in both socket faces.

We claim:

1. A carbon-electrode joint, comprising two carbon electrodes coaxially aligned in abutment with each other and forming each a generally conical and threaded socket in its butt face, in combination with a double-conical screw nipple having respective conical threads engaging the respective threads of said two sockets, the thread flanks that on each of the two nipple cones face away from the butt faces being spaced from the adjacent socket-thread flanks a distance approximately equal to the corresponding distance between the respective thread flanks of the other cone and socket; and an insert for maintaining said equal flank spacing, said insert being located in some of the turns of the threads of one of the first screwed-together socket and nipple respectively, said insert being formed of material deformable at the electrode operating temperature, said insert consisting of paper material carbonizable at said temperature, whereby the hotter nipple can expand in the colder socket.

2. A carbon-electrode joint, comprising two carbon electrodes coaxially aligned in abutment with each other and forming each a generally conical and threaded socket in its butt face, in combination with a double-conical screw nipple having respective conical threads engaging the respective threads of said two sockets, the thread flanks that on each of the two nipple cones face away from the butt faces being spaced from the adjacent socket-thread flanks a distance approximately equal to the corresponding distance between the respective thread flanks of the other cone and socket; and an insert for maintaining said equal flank spacing, said insert being located in some of the turns of the threads of one of the first screwed-together socket and nipple respectively, said insert being formed of material deformable at the electrode operating temperature, said insert consisting of paper material carbonizable at said temperature and containing hard granular substance on both surfaces to prevent loosening of the threaded junction up to carbonization of said material, whereby the hotter nipple can expand in the colder socket.

3. A carbon-electrode joint, comprising two carbon electrodes coaxially aligned in abutment with each other and forming each a generally conical and threaded socket in its butt face, in combination with a double-conical nipple plug having respective screw threads engaging the respective threads of said two sockets, the thread flanks that on each of the two nipple cones face away from the butt faces being spaced from the adjacent socket-thread flanks a distance approximately equal to the corresponding distance between the respective thread flanks of the other cone and socket, said nipple plug and each of said sockets having a thread contour whose crest is radially spaced from the bottom of the counter thread a distance which at normal room temperature is at least 0.05% of the outer diameter of the nipple thread, whereby, when said electrodes are in use, the hotter nipple can expand in the colder socket.

4. A carbon-electrode joint, comprising two carbon electrodes coaxially aligned in abutment with each other and forming each a threaded socket in its butt face, in combination with a double-screw nipple having respective threads on each half portion thereof for engaging the respective counter threads of said two sockets, abutment means disposed on a first portion of said nipple to be screwed in, said abutment means being engageable with the corresponding electrode socket in such manner that of the two flank faces on each thread of said first nipple portion, only the thread flank facing said butt face engages the corresponding counter thread of said corresponding socket, whereby after screwing the second electrode onto said nipple the spacing between the nipple thread flanks facing away from the butt face of the electrode and the corresponding socket counter thread flanks are approximately equal in both nipple portions.

5. A carbon-electrode joint according to claim 4, said abutment means being disposed on only thread flanks facing away from said butt face and on at least one but less than all of the turns of threads of one of the first screwed-together socket and nipple respectively, said insert being formed of material deformable at the electrode operating temperature, whereby the hotter nipple can expand into the colder socket.

6. A carbon-electrode joint according to claim 4, said abutment means including means within the space defined by said two sockets for maintaining said equal flank spacing during use of the joined electrodes whereby the hotter nipple can expand within the colder socket.

7. In an electrode joint according to claim 4, said abutment means comprising spacer bodies of thermally instable material located between said adjacent thread flanks of said nipple and corresponding socket, respectively.

8. In an electrode joint according to claim 4, said abutment means comprising a spacer body of thermally instable material adjacent to the bottom of only one of said sockets, and having a coefficient of thermal expansion not greater than the material of said electrodes.

9. In an electrode joint according to claim 4, said screw nipple comprising a double-conical nipple plug having respective coefficients of thermal expansion in the longitudinal and transverse directions respectively whose ratio is at most equal to the tangent of the angle of inclination between the thread flanks and the electrode front face.

10. In an electrode joint according to claim 4, the nipple-thread flanks facing toward said butt faces and in pressure contact with the respective flanks of said sockets having relative to the electrode front face an angle of inclination larger than 0° and smaller than 30°.

11. In an electrode joint according to claim 4, the nipple-thread flanks facing toward said butt faces and in pressure contact with the respective flanks of said sockets having relative to the electrode front face an angle of inclination between 5° and 20°.

12. A carbon-electrode joint, comprising two carbon electrodes coaxially aligned in abutment with each other and forming each a generally conical and threaded socket in its butt face, in combination with a double-conical screw nipple member having respective conical threads engaging the respective threads of said two sockets, a spacer member for spacing the thread flanks that on each of the two nipple cones face away from the butt faces at a distance from the adjacent socket-thread flanks, said distance being approximately equal to the corresponding distance between the respective thread flanks of the other cone and socket; said spacer member being disposed on the bottom of the socket of the electrode first joined with said nipple member and in pressure-engagement with the adjacent front of said nipple member so as to form a stop limiting the screwing-in of said nipple member for maintaining said spacer member being located in the lower socket of the upper one of said two electrodes and forming at the normal operating temperature an electric connection between said nipple and the socket bottom, said equal flank spacing, said spacer member having a thermal coefficient of expansion at most equal to that of said electrodes.

13. In an electrode joint according to claim 12, said spacer member consisting of material plastically deformable above 200° C. so as to permit thermal elongation of said nipple member in the axial direction.

14. In an electrode joint according to claim 13, said spacer member consisting at least partly of carbide-forming metal.

15. A carbon-electrode joint, comprising two carbon electrodes coaxially aligned in abutment with each other and forming each a generally conical and threaded socket in its butt face, in combination with a double-conical screw nipple member having respective conical threads engaging the respective threads of said two sockets, abutment means disposable between said nipple and one of said sockets in such a manner that the thread flanks that on each of the two nipple cones face away from the butt faces are spaced from the adjacent socket-thread flanks a distance approximately equal to the corresponding distance between the respective thread flanks of the other cone and socket; each of said sockets having a radially enlarged shoulder recess at the socket mouth, said nipple member having a centrally located and radially protruding annular collar portion, said collar portion being in contact with said shoulder recess of the socket first joined with said nipple member so as to maintain said equal flank spacing.

References Cited in the file of this patent

UNITED STATES PATENTS

| | | |
|---|---|---|
| 1,368,087 | Woodward | Feb. 8, 1921 |
| 1,743,888 | Hamister | Jan. 14, 1930 |
| 1,943,879 | Rea | Jan. 16, 1934 |
| 2,399,526 | Warren | Apr. 30, 1946 |
| 2,510,230 | Johnson et al. | June 6, 1950 |
| 2,735,705 | Johnson et al. | Feb. 21, 1956 |
| 2,810,117 | Abbott | Oct. 15, 1957 |